Figure 1:
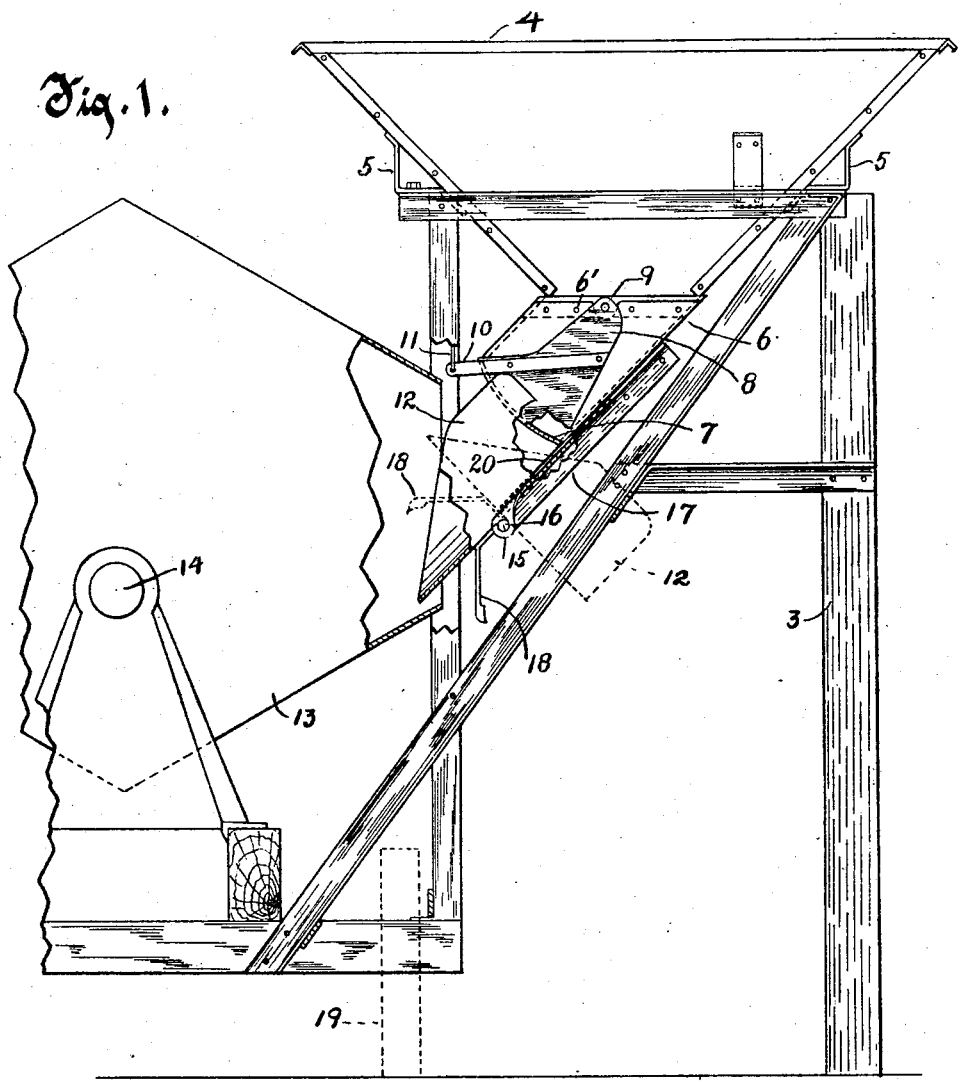

T. L. SMITH.
MIXING MACHINE.
APPLICATION FILED NOV. 18, 1905.

968,275.

Patented Aug. 23, 1910.
2 SHEETS—SHEET 1.

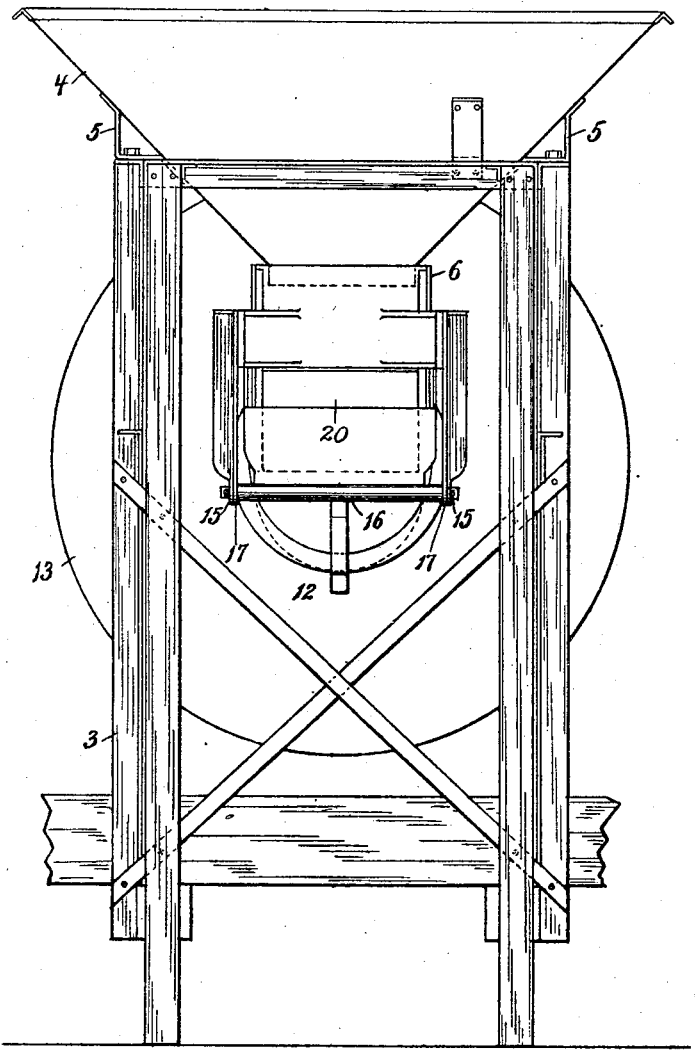

UNITED STATES PATENT OFFICE.

THOMAS L. SMITH, OF MILWAUKEE, WISCONSIN, ASSIGNOR TO THE T. L. SMITH COMPANY, OF MILWAUKEE, WISCONSIN, A CORPORATION OF WISCONSIN.

MIXING-MACHINE.

968,275.  Specification of Letters Patent.  Patented Aug. 23, 1910.

Application filed November 18, 1905. Serial No. 288,033.

*To all whom it may concern:*

Be it known that I, THOMAS L. SMITH, residing in Milwaukee, county of Milwaukee, and State of Wisconsin, have invented new and useful Improvements in Mixing-Machines, of which the following is a description, reference being had to the accompanying drawings, which are a part of this specification.

My invention has relation to improvements in machines for mixing concrete, and analogous materials, having special reference to the charging hoppers used in connection with such machines.

In connection with the ordinary form of charging hoppers for mixing machines, a spout is employed which extends into the charging opening of the receptacle, and this spout is adapted to receive the materials to be mixed, and convey said materials through the charging opening of the hopper. The mixing receptacles employed in connection with ordinary types of mixing machines, are, of course, tiltable so as to provide for their discharge ends being depressed to discharge the mixed contents. In thus depressing the discharge end of the receptacle, the charging end thereof is necessarily raised. Under some constructions, the spout is capable of traveling toward and to the charging end of the receptacle by a sliding movement, and when slid toward said charging end is made to telescope into the charging opening; while in other constructions, the spout is hinged, and when it is desired to turn the outer end of the spout out of registration with the charging opening of the receptacle, it is necessary to turn said spout outwardly on its pivot or hinge. In both of these constructions, therefore, it is necessary to employ a man whose duty it is to move the spout outwardly either by sliding said spout, or turning the same on its hinge, in order to prevent the spout from interfering with the up movement of the charging end of the receptacle, when the discharge end of said receptacle is depressed.

It is the primary object of my invention to provide a construction of spout which will be automatically operated when the mixing receptacle is tilted, so that when said receptacle is tilted to the discharging position the spout is automatically turned in a direction to permit the free movement of the receptacle, and when said receptacle is turned back to its original mixing position, the said spout is automatically returned to its normal position, in line to conduct the materials to be mixed into the receptacle.

With the above primary object, and other incidental objects, in view, the invention consists of the devices and parts, or their equivalents, as hereinafter set forth and claimed.

In the accompanying drawings, Figure 1 is a side elevation of the invention, showing the same adjacent to the charging end of a tiltable mixing receptacle, parts broken away; and Fig. 2 is a view at right angles to Fig. 1.

Referring to the drawings, the numeral 3 indicates a supporting frame work of any suitable form and construction adapted to support the improved mechanism. In the upper portion of this frame work is secured a hopper 4, which extends a short distance below the top beams of the frame work, and is secured to said beams, preferably by means of brackets 5 attached to the sloping sides of the hopper, and secured by means of bolts to the top beams of the frame. The hopper is initially set in the frame, and the brackets are then secured to the horizontal top beam. This provides for readily setting the hopper in place and securing it to the frame, and for readily removing the hopper when desired, the removal being effected merely by withdrawing the bolts. Below the discharge opening of the hopper, and secured in the frame, is a conduit 6, which is on a decline toward one side of the frame. This conduit is secured to the lower ends of the sides of the hopper 4 by bolts 6'. The lower open end of this conduit is normally closed by means of a curved gate 7, said gate having its side members 8 straddling the sides of the conduit and pivoted at 9 to the upper ends of said sides of the conduit. One of these side members of the gate 7 has connected thereto an arm 10, which arm extends outwardly, and has secured to its outer end a rope or cable 11, which rope extends upwardly, and preferably over a pulley, so that its free end is in a position to be conveniently reached by an operator standing on the platform.

In line with the open lower end of the conduit 6 is a hinged spout 12, the outer end of said spout adapted to discharge into the charging end of the mixing receptacle 13 of a well known form of mixing machine. This mixing receptacle is usually revoluble, although if desired it may be non-revoluble, but provided interiorly with rotatable mixing mechanism, and is also tiltable upon trunnions 14, said trunnions providing for tilting the receptacle, after the mixing operation is completed, to such position that the end thereof (not shown) where the discharge opening is located will be depressed so as to discharge the mixed contents. This tilting may be effected by suitable mechanism, or by hand, as desired.

In the ordinary construction of charging hopper, before the receptacle is tilted for the purpose of discharging its mixed contents, it is necessary for an attendant to move the spout 12 by hand, so that the end of the mixing receptacle which is adjacent to the discharge end of the spout may have an opportunity to pass by said discharge end of the spout without impediment. This, therefore, renders it absolutely necessary that one man be employed constantly for the purpose of operating the spout in a direction to permit the receptacle to be tilted to a discharging position.

The novel and important feature of my invention specifically stated is to provide a means whereby, when the mixing receptacle is tilted to a position to discharge its mixed contents, the spout will, when the mixing receptacle is so tilted, be itself tilted upwardly so that its end which normally extends into the charging opening of the receptacle will be thrown to such position that the charging end of said receptacle on its upward swing will clear the end of the spout, and, on the other hand, when the mixing receptacle is tilted back to its original position, said receptacle will by contact with a projection from the spout cause said spout to be automatically returned to its original position. In my improved construction, the spout is hinged or pivoted. This may be provided for by employing ears 15, 15 projecting from the spout, and which ears receive the ends of a hinge or pivot pin 16, said pin having its bearings in arms 17, 17, said arms being fastened to the rear side of conduit 6. Secured to the under side of the spout is an arm 18. This arm extends downwardly from the under side of the spout in a vertical line, and may be conveniently secured to the spout by having its upper end bent in a line parallel with the under surface of the spout, the said bent end being secured to said under surface.

If desired, the frame work may be mounted on wheels so as to provide for portability, and these wheels can be removed when the machine is in use. In the drawings, I have shown one of these wheels in dotted lines, and have indicated the same by the numeral 19.

In the use of my invention, it will be assumed that all of the parts are in full line position shown in the drawings. In the charging operation, the rope or cable 11 is raised so as to open the gate 7. This allows the batch of materials deposited in the hopper to pass through the conduit 6, thence into the spout 12, and finally into the mixing receptacle. After the receptacle is so charged, the rope 11 is released, and the gate 7 thereby closed, when of course another batch of materials to be mixed can be deposited in the hopper. The materials in the mixing receptacle are then subjected to the mixing operation. After the mixing operation is completed, in order to discharge the mixed batch from the receptacle, the said receptacle is tilted on the trunnions 14 so as to depress its discharge end and raise its opposite charging end. When the charging end is thus raised it will contact with the outer end of the spout 12, and cause said spout to be turned on its pivot or hinge from the full line position shown in the drawings to the dotted line position shown in Fig. 1. In this dotted line position the outer end of the spout is out of line with the arc described by the charging end of the receptacle in the rotative movement of said receptacle toward its discharging position, and consequently the spout offers no impediment to the free tilting of the receptacle. During the discharging operation, therefore, the spout occupies the dotted line position. The spout is returned to its normal full line position by the action of the receptacle in making its return movement. It will be seen that when the spout is in the dotted line position, the arm 18 thereof projects outwardly from the spout in a substantially horizontal line and in the path of movement of the receptacle. It follows that in the operation of tilting the receptacle back to its mixing position the edge of the charging opening of said receptacle will contact with the arm 18, and hence cause the spout to be returned to its inclined position in line with the conduit 6, and with its outer end extending into the charging opening of the receptacle. It will be further understood that in the operation just described, the rising charging end of the receptacle carries with it the end of the spout until the vertical line through the center of gravity passes by the pivot, and from this point gravity completes the movement of the spout, and the said spout retains its final tilted dotted line position, shown in Fig. 1, by gravity. In the reverse movement of the receptacle, a similar action takes place, that is to say, the receptacle contacts with the arm 18 and carries the spout with it until the vertical line through the center of gravity passes by the pivot, when of course gravity completes the movement of the spout, and the spout is retained in its full line position, Fig. 1, by gravity. This is an important feature of my invention, inasmuch as gravity completes the tilting movement of the spout each way, the contact of the receptacle only starting the movement, and the spout remaining in each of its tilted positions by gravity. By this construction and arrangement, it will be seen that there is absolutely no contact between the receptacle and the spout during the mixing operation, whereby an advantage of considerable importance is obtained.

If means were not provided to guard against it, the material flowing through the conduit 6 would strike against the bottom of the spout 12, and have a tendency to turn the spout on its pivot so as to depress the upper end of said spout, and consequently throw the spout from the full line position, Fig. 1, at a time when it is desired that it should remain in said position, in order to deposit the materials into the receptacle 13. To guard against the above contingency, I provide a plate 20, preferably of steel, located above the bottom of the spout and between the sides of said spout, and having its lower end terminating just above the pivot of the spout. Besides possessing the function just explained, the plate 20 also acts as a stop to permit gravity to maintain the spout in its full line position, Fig. 1, and also as a stop to permit gravity to maintain the spout in its dotted line position, Fig. 1, the bottom of the spout in this latter adjustment being against or in close proximity to the lower end of the plate 20.

I have heretofore in the specification referred to the provision of wheels 19 adapted to provide for the portability of the device. It will be understood, however, that only the portion of the frame which carries the receptacle 13 is made portable, the remaining portion of the frame being temporarily removed, it being understood that the frame members are so connected together as to permit of ready dismantling.

What I claim as my invention is:

1. The combination of a tiltable mixing receptacle having separate charging and discharging openings, a spout pivoted to a support and extending into the charging opening of the mixing receptacle and the lower end of said spout being positioned to be tilted upwardly by said receptacle when said receptacle is moved toward the discharging position and to remain in said position until the receptacle is again moved, and a means coöperating with the spout and with the receptacle and positioned to be swung into the path of the arc of movement of the charging end of the receptacle when it is swung into discharging position.

2. The combination of a tiltable mixing receptacle having separate charging and discharging openings, a spout pivoted to a support and extending into the charging opening of the receptacle, the lower end of said spout being positioned to be tilted upwardly and over the center of gravity of its pivotal connections by said receptacle when said receptacle is moved toward the discharging position and to remain in said position until the receptacle is again moved, and a means coöperating with the spout and with the receptacle and constructed to be moved into a position to swing the spout downwardly into charging position when the mixing receptacle is swung into a position to be charged with materials.

3. The combination of a tiltable mixing receptacle having separate charging and discharging openings, a spout pivoted to a support and extending into the charging opening of the receptacle and the discharging end of said spout being positioned to be tilted upwardly and over the center of gravity of its pivotal connection by the discharge end of the receptacle moving toward the discharging position and to remain in said position until the receptacle is again moved, and a means coöperating with the spout and with the receptacle and positioned to be swung into the path of the arc of movement of the charging end of the receptacle when it is swung into discharging position and to be engaged thereby when the receptacle is swung back into charging position.

4. The combination of a tiltable mixing receptacle having a charging opening and a discharge opening, a pivoted spout having its discharge end normally in register with and extending into the charging end of the receptacle so as to be contacted with thereby when the charging end of the receptacle is turned upwardly, a frame to which the spout is pivoted, and an arm connected to the spout and projecting downwardly therefrom, when the spout is in its normal position, said arm adapted to be engaged by the charging end of the receptacle, when said charging end is turned downwardly to automatically turn the spout downwardly to its normal position.

5. The combination of a mixing receptacle having a charging opening and a discharge opening and adapted to be tilted, a frame, a spout pivoted on the frame and adapted to receive therein the materials to be mixed, and having its discharge end normally in register with the charging opening of the receptacle, a projection extending from the spout, and co-acting means between the spout and the receptacle and adapted, when the receptacle is tilted from its normal mixing position in a direction to elevate its charging end, to cause the spout to be turned rearwardly on its pivot outside of the arc described by the charging end of the receptacle, the pivot of the spout being so arranged that said spout is retained in this latter position by gravity, and the said receptacle, when returned to its normal mixing position, adapted to initially engage with the projection from the spout and thereby carry said spout therewith until the vertical line through the center of gravity of the spout passes by the pivot, when said spout completes its return movement by gravity.

6. The combination of a mixing receptacle having a charging opening and a discharge opening and adapted to be tilted, a frame, a spout pivoted on the frame and having a projection extending therefrom, said spout adapted to receive therein the materials to be mixed and having its discharge end normally in register with and extending into the charging opening of the receptacle, said receptacle, when tilted from its normal mixing position in a direction to elevate its charging end, adapted to engage the spout to turn said spout rearwardly on its pivot outside of the arc described by the charging end of the receptacle, the pivot of the spout being so arranged that said spout is retained in this latter position by gravity, and the receptacle adapted, when returned to its mixing position to initially engage with the projection from the spout and thereby carry said spout therewith until the vertical line through the center of gravity of the spout passes by the pivot, when said spout completes the balance of its return movement by gravity.

7. The combination of a mixing receptacle, having a charging opening and a discharge opening and adapted to be tilted, a frame, a spout pivoted on the frame and having a projection extending therefrom, said spout adapted to receive therein the materials to be mixed and having its discharge end normally in register with and extending into the charging opening of the receptacle, the said receptacle, when tilted from its normal mixing position in a direction to elevate its charging end, adapted to initially engage the spout and turn said spout rearwardly on its pivot outside of the arc described by the charging end of the receptacle, the spout thereafter completing its movement by gravity, and the pivot of the spout being so arranged that said spout is retained in its final position by gravity, and the receptacle adapted, when returned to a mixing position, to initially engage with the projection from the spout and thereby carry said spout therewith until the vertical line through the center of gravity of the spout passes by the pivot, when said spout completes the balance of its return movement by gravity, and is retained in this position by gravity.

8. The combination of a mixing receptacle having a charging opening and a discharge opening, a frame, a hinged or pivoted spout adapted to be tilted to and from a position in which it feeds the material through the charging opening of the receptacle, and a fixed plate located above the floor of the spout and between the sides of said spout, and having its lower end terminating above the pivot of the spout.

In testimony whereof, I affix my signature, in presence of two witnesses.

THOMAS L. SMITH.

Witnesses:
ANNA F. SCHMIDTBAUER,
A. L. MORSELL.